United States Patent Office 3,399,173

Patented Aug. 27, 1968

3,399,173

LIGHT-STABLE POLYADDITION COMPOUNDS

Hansjörg Heller, Riehen, Jean Rody, Basel, and Ernst Keller, Binningen, Switzerland, assignors to J. R. Geigy S.A., Basel, Switzerland No Drawing. Continuation of application Ser. No. 535,740, Mar. 4, 1966. This application Feb. 9, 1967, Ser. No. 614,816

Claims priority, application Switzerland, June 16, 1961, 7,101/61

17 Claims. (Cl. 260—47)

ABSTRACT OF THE DISCLOSURE

Organic addition polymers of ethylenically unsaturated polymerizable organic monomers are provided which consist essentially of divalent repetitive units of polymerizable 2-(2'-hydroxyphenyl)-benzotriazole compounds and units of ethylenically unsaturated organic monomer different from the said benzotriazole units. Such polyaddition compounds have improved stability to light and are useful as industrial products. The organic addition polymers are prepared by copolymerizing with the polymerizable 2-(2'-hydroxyphenyl)-benzotriazole compounds containing at least one copolymerizable ethylenically unsaturated group with conventional ethylenically unsaturated compounds.

This application is a continuation of our copending patent application Ser. No. 535,740, filed Mar. 4, 1966, and now abandoned, which application is in turn a continuation-in-part of our application Ser. No. 202,665, filed June 15, 1962, and now abandoned. In addition, this application is a divisional application of our application Ser. No. 544,834, filed Apr. 25, 1966, which application is in turn a continuation-in-part of said application Ser. No. 535,740, now abandoned.

The present invention concerns a process for the production of UV-absorbing polyaddition compounds having improved stability to light as well as, as industrial product, the light stable polyaddition compounds.

It has been found that UV-absorbing polyaddition compounds having improved stability to light are obtained by copolymerizing ethylenically unsaturated compounds with 2-(2'-hydroxyphenyl)-benzotriazole compounds which contain at least one copolymerizable ethylenically unsaturated group.

These polymerizable 2-(2'-hydroxyphenyl)-benzotriazole compounds afford repetitive units which, in the polyaddition compounds according to the invention, correspond to the formula

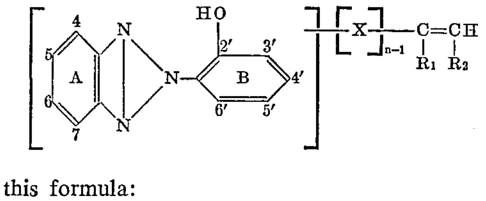

(I)

In this formula:

X represents a divalent, non-color-imparting bridge member, the structure of which is defined further bleow, $R_1$ represents hydrogen, lower alkyl, chlorine or phenyl, and $R_2$ represents hydrogen, carboxyl or alkoxycarbonyl of from 2 to 9 carbon atoms, at least one of $R_1$ and $R_2$ being hydrogen, and $n$ represents 1 or 2. However, preferably $n$ represents 2.

In a preferred subclass of compounds according to the invention, which are free from inherent yellowish tints, —X— in Formula I represents one of the following bridge members:

(a) D, being alkylene of from 1 to 6 carbon atoms or benzylene, the groupings

—$CH_2$—, —CH(lower alkyl)— and —CH(phenyl)— being preferred, said D being linked in 3'-position to ring B;

(b)

—D—N($R_3$)—CO— linked via D in one of the positions 3' and 5' to ring B, wherein D has the same meaning as under (a), supra, $R_3$ represents hydrogen, alkyl of from 1 to 7 carbon atoms, cyclohexyl or benzyl, D being preferably —$CH_2$— attached to the 3'-position;

(c) —D'—COO—$(CH_2)_{y-1}$—, linked via D' in one of positions 3' and 5' to ring B, wherein D' represents D or phenylene wherein —D— has the same meaning as under (a), supra and $y$ represents either 1 or 2; the groupings —$CH_2$—$CH_2$—COO—$(CH_2)_{y-1}$— and —$CH_2$—(phenylene)—COO—$(CH_2)_{y-1}$— being the preferred ones;

(d)

—D—CO—N($R_3$)—$CH_2$— linked via D in 3'- or 5'-position to ring B, wherein D and $R_3$ have the same meanings as under (b), supra; preferred groups are $CH_2$—$CH_2$—CO—N($R_3$)—$CH_2$— and —$CH_2$—(phenylene)—CO—N($R_3$)—$CH_2$— or —X—C($R_1$)=CH($R_2$) represents

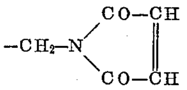

linked in 3'-position to ring B.

UV-absorbing polyaddition compounds according to the invention are also those dervied from a second subclass of copolymerizable compounds, which subclass is generally characterized by slight inherent yellowish tints or somewhat lower light fastness, divalent repetitive units of compounds of this subclass being (i) units of the formula

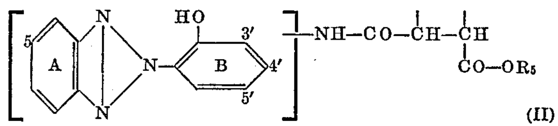

(II)

wherein $R_5$ represents alkyl of from 4 to 12 carbon atoms, benzyl or cyclohexyl;

(ii) units of the formula

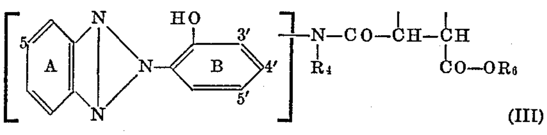

(III)

wherein $R_6$ represents hydrogen, alkyl of from 1 to 12 carbon atoms, benzyl or cyclohexyl, and $R_4$ represents alkyl of from 1 to 7 carbon atoms, cyclohexyl, or benzyl; cyclohexyl or benzyl;

(iii) units of the formula

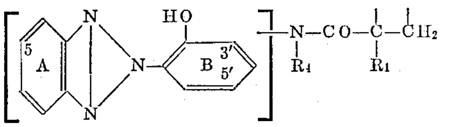

(IV)

wherein $R_1$ and $R_4$ have the same meanings as given hereinbefore; each of the acylamino substituents in units (i), (ii) and (iii) being linked either n 5-position to ring A or in one of positons 3′, 4′ and 5′ to ring B; and (iv) units of the formula

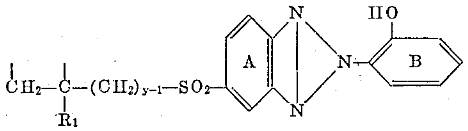

(V)

wherein $R_1$ has the same meaning as given hereinbefore, and $y$ is one of integers 1 and 2;

Furthermore, polyaddition compounds according to the invention are those comprising repetitive units from copolymerizable compounds from a third subclass, which compounds impart a slight yellowing effect to materials into which they are incorporated by copolymerization, repetitive units of compounds of this third subclass having the formula:

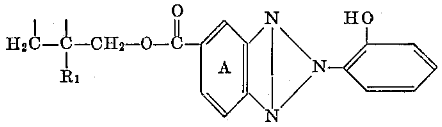

(VI)

in which formula $R_1$ has the same meaning as given hereinbefore; or having the formula:

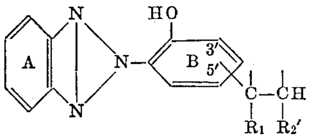

(VII)

wherein $R_1$ has the same meaning as given hereinbefore, and $R_2'$ represents hydrogen or methyl, at least one of $R_1$ and $R_2'$ being hydrogen, and the substituent

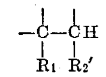

being linked to one of the 3′- and 5′-positions of ring B.

Finally, polyaddition compounds according to the invention are those comprising repetitive units from compounds of a fourth subclass, which compounds impart a slight yellowing effect to materials into which they are incorporated by copolymerization; repetitive units of this subclass of compounds being of the formula:

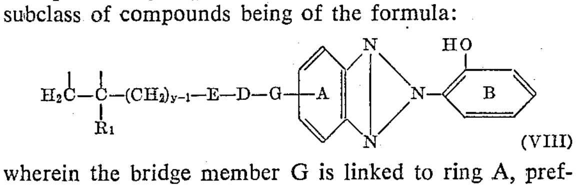

(VIII)

wherein the bridge member G is linked to ring A, preferably in 5-position, and

D and $y$ have the same meanings as hereinbefore,

G represents—$SO_2$—NH—, $SO_2$—N(lower alkyl)—, —CO—NH—, or —CO—N(lower alkyl)—, and E represents —O—, —O—CO—, —CO—, $-\underset{R_3}{N}-CO-$, $-SO_2-$ or $-\underset{R_3}{N}-SO_2-$ $R_3$ having the same meaning as under (b), supra.

"Lower alkyl" herein and in the appended claims means alkyl groups of from 1 to 5 carbon atoms.

The benzene ring A can further contain, for example, in the 4-, 5- and 6-positions alkyl groups such as methyl, ethyl, n-propyl, isopropyl, n-, iso- or tert. butyl or octyl groups, alkoxy groups such a methoxy or butoxy groups, halogens such as fluorine, chlorine or bromine; carboxylic acid ester groups, i.e. carboxylic acid alkylester groups such as carbomethoxy, carboethoxy, carbopropoxy or carbobutoxy groups; carboxylic or sulfonic acid amide groups possibly aliphatically, cocloaliphatically, araliphatically or aromatically substituted at the nitrogent atom such as carboxylic or sulfonic acid amide, methylamide, ethylamide, cyclohexylamide, benzylamide, phenylamide, dimethylamide, diethylamide, N - methyl - N-cyclohexyl amide, γ-methoxypropylamide, piperidide or morpholide groups or alkylsulfonyl such as methylsulfonyl or ethylsulfonyl groups.

The benzene ring B can be further substituted in the 3′-, 4′- and 5′-positions, for example, by hydrocarbon groups such as methyl, ethyl, benzyl, cyclohexyl of phenyl groups, by alkoxy groups such as methoxy, ethoxy, propoxy, isopropoxy or n-butoxy groups or by halogens such as fluorine, chlorine or bromine.

In preferred compounds the repetitive units of which fall under the Formulas I to VIII, apart from the substituent bearing the double bond through which polymerization is effected and which is present at one of the nuclei A and B, the nucleus A is substituted in the 4-, 5- and/or 6-position by hydrogen, chlorine or bromine, lower alkyl, lower alkoxy, carboxyl, alkoxy-carbonyl of from 2 to 9 carbon atoms, cyclohexyloxycarbonyl, lower alkyl sulfonyl, N-lower alkyl-substituted carbamyl, N-cyclohexyl-substituted carbamyl, N-lower alkyl-substituted sulfamyl, N-cyclohexyl substituted sulfamyl, N-(oxa-lower alkyl)-substituted carbamyl, or N-(oxa-lower alkyl) substituted sulfamyl; and the nucleus B is substituted in positions 3′, 4′ and/or 5′ by hydrogen, alkyl or from 1 to 12 carbon atoms, lower alkoxy, chlorine, bromine, phenyl-lower alkyl, phenyl or cyclohexyl.

Benzotriazole compounds according to the invention which absorb particularly at long wave lengths contain acidifying substituents in the 4- and/or 5-position or basifying substituents in the 5′-position. Benzotriazole compounds having particularly high molar extinction in the region of 330–350 mμ contain basifying substituents in the 5- and/or 4′-position. The molar absorbtion in the region of 290–320 mμ is promoted by possibly further substituted alkyl substituents in the 3′-position.

Examples of basifying substituents are alkoxy groups such as the methoxy, isopropoxy, cyclohexyloxy and benzyloxy groups; examples of acidifying substituents are alkylsulfonyl groups such as the methyl and ethyl sulfonyl groups, sulfonic acid amide groups such as the sulfonic acid methylamide, butylamide and cyclohexylamide groups and the carboxyl group as well as carboxylic acid ester groups.

On copolymerization with conventional, ethylenically unsaturated monomers which form polymers in the liquid phase, the benzotriazole compounds mentioned hereinbefore form polyaddition compounds which contain as integral grouping, the divalently bound repetitive units of one of Formulas I to VIII.

The preferred addition polymers contain repetitive units derived from the first subclass of compounds, i.e., those having substituents bearing the carbon-to-carbon double bond as defined under (a) to (e), inclusive.

The invention concerns in its main aspect addition polymers of copolymerizable ethylenically unsaturated monomers, which monomers form copolymers in liquid phase. The copolymerizates should contain 0.01% to 25% by weight of the total weight of the polymer, in the form of repetitive units of Formulas I to VIII as an integral chemical moiety.

The balance of the copolymerizate consists essentially of units of other ethylenically unsaturated monomer copolymerizable with said 2-(2′-hydroxyphenyl)-benzotriazole, especially those defined more in detail further below.

Compounds of Formula I are obtained by known methods, e.g., (1) Conversion of an azo compound containing an ethylenically unsaturated group into the corresponding 2-(2'-hydroxyphenyl)-benzotriazole compound.

(2) By introducing a substituent containing an ethylenically unsaturated group into a 2-(2'-hydroxyphenyl)-benzotriazole compound.

(3) By forming an ethylenically unsaturated group in a side chain of a 2-(2'-hydroxyphenyl)-benzotriazole compound, or (4) By rearranging, according to Claisen, a 2-(2'-alkenyloxyphenyl)-benzotriazole compound containing replaceable hydrogen in the 3'-position into the corresponding 3'-alkenyl compound.

The method mentioned under point 1 consists, for example, in oxidizing a 2-amino-2'-hydroxy-1,1'-azobenzene compound containing at least one ethylenically unsaturated group with, e.g., salts of divalent copper in a neutral to alkaline medium, or in reducing a 2-nitro-2'-hydroxy-1,1'-azobenzene compound containing at least one such group, e.g., with zinc dust in an alkaline medium.

The introduction of a substituent having an ethylenically unsaturated group mentioned under point 2 is done, for example, by acylating a 2-(2'-hydroxyphenyl)-benztriazole compound containing at least one acylatable hydroxyl or amino group with an ethylenically unsaturated acylating agent, e.g. with an ethylenically unsaturated acid such as acrylic or methacrylic acid or with their reactive derivatives, e.g. the halides; or it is done by etherifying a 2-(2'-hydroxyphenyl)-benztriazole compound containing at least one hydroxyl group which can be etherified with a polymerisable unsaturated alcohol or a reactive derivative thereof, or by esterifying a 2-(2'-hydroxyphenyl)-benztriazole carboxylic acid with a polymerisable ethylenically unsaturated alcohol, or by amiding a 2-(2'-hydroxyphenyl)-benztriazole carboxylic acid with a polymerisable ethylenically unsaturated amino, or by reacting a 2-(2'-hydroxyphenyl)-benztriazole compound containing at least one replaceable hydrogen atom in the nucleus with a compound capable of aromatic substitution, which compound contains an ethylenically unsaturated group, such as the methylol compound of the amide of an ethylenically unsaturated acid.

An ethylenically unsaturated group in the side chain, as mentioned under point 3, is formed, for example, by splitting off halogen hydracid from 2-(2'-hydroxyphenyl)-benztriazole compounds containing $\beta$-halogen alkyl groups with basic reactants, or by splitting off tertiary amines from ammonium hydroxides of 2-(2'-hydroxyphenyl)-benztriazole compounds containing quaternary aminoalkyl groups. Of the benztriazole compounds so produced the most valuable copolymers are those which absorb the most UV light, as a slight amount thereof is sufficient to make the end product dense to UV light.

The conventional ethylenically unsaturated compounds are copolymerised with the 2-(2'-hydroxyphenyl)-benztriazole compounds containing at least one copolymerisable ethylenically unsaturated group by means of free radicals. These are formed, for example, on warming benzoyl peroxide, $\alpha,\alpha'$-azodiisobutyronitrile and tert. butyl peroxide, or in redox systems such as mixtures of salts of persulphuric acid and sulphurous acid or by strong irradiation. The polymerisation can be performed in the mass such as, e.g., in the copolymerisation with methyl methacrylate, it can be performed in organic solvents such as benzene, toluene, isopropanol or, principally, it can be performed in aqueous emulsion or suspension such as, e.g., in the production of copolymers with vinyl chloride, vinylidene chloride and styrene polymers or of terpolymers with butadiene/styrene or butadiene/acrylonitrile. In general, the processes known for the copolymerisation of conventional monomers with possible small adaptations can be successfully used.

Ionic polymerisations are also possible in some cases but these are difficult to perform because of the strongly polar character of the monomeric 2-(2'-hydroxyphenyl)-benztriazole compounds.

The following are given as examples of conventional ethylenically unsaturated compounds which can be employed for the production of the copolymers according to the invention:

(1) Monosubstituted ethylenes, i.e., vinyl compounds such as vinyl halides, e.g., vinyl fluoride or vinyl chloride; vinyl esters of organic carboxylic acids, e.g., vinyl acetate, vinyl stearate or vinyl benzoate; vinyl ketones, e.g., vinylmethyl ketone or vinylcyclohexyl ketone; N-vinyl compounds, e.g., vinyl pyrrolidone, vinyl carbazole or vinylisocyanate; S-vinyl compounds such as vinylmethyl thioether, vinylmethyl sulphone or vinyl sulphonic acid; vinyl-substituted homocyclic- or heterocyclic-aromatic compounds such as styrene, vinyl toluene, 1-vinyl naphthalene or 2-vinyl pyridine; acrylic compounds, e.g., acrylic acid, acrylonitrile, acrylic acid phenyl ester, acrylic acid ethyl ester, acrylic acid amide or acrylic acid butylamide; allyl compounds such as esters and ethers of allyl alcohol, e.g., allyl benzoate or phenylallyl ether; derivatives of allylamine such as acetic acid allylamide, allyl urea or N-allyl-2,4,6-triamino-1,3,5-triazine or C-allyl compounds such as allyl benzene;

(2) 1,1-disubstituted ethylenes, i.e., vinylidene compounds, e.g., vinylidene chloride, vinylidene cyanide, methacrylonitrile methacrylic acid methyl ester, $\alpha$-chloroacrylic acid ethyl ester, $\alpha$-methylstyrene, isobutylene or isopropenyl acetate.

(3) 1,2-disubstituted ethylenes such as vinylene carbonate or maleic acid anhydride, maleic acid imide, fumaric acid ethyl ester, maleic acid dinitrile, acenaphthylene or S,S-dioxobenzthiophene; (these latter monomers can only be used for the production of terpolymers).

(4) Di- and poly-enes, particularly conjugated polyenes such as butadiene, isoprene, chloroprene, sorbic acid, sorbic acid methyl ester, or compounds having several isolated double bonds such as divinylbenzene, acrylic acid allyl ester, phthalic acid diallyl ester, glucose triallyl ether, N,N',N''-triallyl-2,4,6-triamino-1,3,5-triazine or, preferably, unsaturated polyesters of maleic acid and polyvalent alcohols.

Of the monomers mentioned, those which can be homopolymerised can be copolymerised with the benztriazole monomers according to the invention or they can be reacted with other monomers to form tertiary and quaternary polymers. The molecular weight of the polymers obtained is of less importance provided that it is higher than the minimum to attain the usual and necessary mechanical and electrical properties. Depending on the polymers, it should be between 5000 and several millions.

In the production of copolymers it should be noted that not all combinations of benztriazole monomers and conventional monomers are equally well suited for copolymerisation. For example, benztriazole derivatives containing allylester groupings as groups capable of addition are well suited for copolymerisation with vinyl esters such as vinyl acetate and vinyl stearate but less suited for copolymerisation with methyl methacrylate. To ascertain the specific suitability of a combination, the "copolymer equation" is used:

$$\frac{d(M_1)}{d(M_2)}=\frac{(M_1)}{(M_2)}\cdot\frac{r_1(M_1)+(M_2)}{(M_1)+r_2(M_2)}$$

The meaning of the symbols and the equations for systems with three monomers (terpolymers) and four monomers (quaternary polymers) as well as the list of values for $r_1$ and $r_2$ are contained, e.g., in "Chemical Review 46 p. 190 (1950), F. R. Mayo and Ch. Walling." If in this equation the benztriazole monomer is $M_1$, the value of $r_2$ should preferably be less than or at most 1. This $r_2$ value can be taken direct from the literature or determined experimentally for each pair of monomers. Approximate values thereof can be ascertained by the "e-Q concept" of Alfrey-Price (loc cit) from the generally known values of $e$ and Q. In determining the $r_2$ values it should be borne in mind that groups which are not conjugated with the C═C bond or with groups conjugated therewith only very slightly influence both the $r$ and the $e$ and Q values. There is no such simple rule for terpolymers and quaternary polymers. In these cases the equations for terpolymers and quaternary polymers have to be solved using the $r$ values of the pairs of monomers taking part in the polymerisation. The benztriazole monomer is useful in such a system if, under the given concentration conditions, $dM_1/(dM_1+dM_2+dM_3+dM_4+ \ldots)$ is at least as big as $M_1/(M_1+M_2+M_3+M_4 \ldots)$. If either one of the above conditions is not fulfilled, a substantial part of the benztriazole monomer remains as free monomer in the finished polymer. In most cases this fact is not harmful. If, however, it is important that there should be no free, i.e., no chemically unbound benztriazole derivative in the polymer, it must be extracted with a solvent in which the polymer is insoluble. Such is the case e.g., in food wrappings where there is a danger of the benztriazole derivative diffusing into the foodstuff.

The 2 - (2′ - hydroxyphenyl)-benztriazole compounds used according to the invention can amount to between 0.01 and 25% of the polymerisable mixture. If the copolymers formed are worked up direct to articles of over 0.1 mm. thickness then contents of 0.05 to 2% calculated on the total weight are preferred; in the case of polymers which are used as very thin coatings and also of polymers to be incorporated as stock concentrates into conventionally produced polymers, contents of 2–20% are preferred. In this case, the colourless benztriazole compounds are particularly valuable as otherwise strong yellow colourings are produced with such high concentrations.

The polymers according to the invention are worked up in the usual way, e.g., by injection moulding, moulding, calandering and casting. The polymers can also be further reacted without changing the degree of polymerisation, e.g., polyvinyl ester can be saponified with the formation of polyvinyl alcohols.

The original physical properties of the new addition polymers (with the exception of the UV absorption) are very similar to those of conventionally produced polymers, i.e., those produced in the absence of copolymerisable 2-(2′-hydroxyphenyl)-benztriazole compounds. Working up in both cases can thus generally be done in the same way. On ageing under the influence of light however, the addition polymers according to the invention show much less alteration of the original physical properties and they are also much less subject to the usual discolourations.

In general, copolymers according to the invention can be employed in the same way as the corresponding conventionally produced polymers. Because of their stability to light and their UV absorption powers, there are additional applications for the copolymers according to the invention, whether as construction material, covering material or as UV filters for packings.

For the production of non-polar copolymers those benztriazole compounds are particularly suitable which themselves contain as few as possible polar groups such as secondary carboxylic or sulfonic acid amide groups. Also, in this case, generally products having a low melting point are preferred because of their improved solubility in the other monomers.

The ethylenically unsaturated monomers copolymerizable with monomers of Formula I have been exemplified hereinbefore. Ethylenically unsaturated monomers such as styrene, methyl methacrylate, vinyl acetate, vinylidene chloride, vinyl chloride, acrylonitrile, butadiene as well as mixtures of same and also such graft copolymers of unsaturated polyesters with styrene and/or methyl methacrylate have been found particularly useful. However, the invention is applicable to the wider range of monomers exemplified hereinbefore. Any of the enumerated monomers can be substituted for any of the analogously substituted ethylenically unsaturated monomers in the subsequent examples.

The following non-limitative examples illustrate the invention. Where not otherwise stated, parts and percentages are given therein by weight. The temperatures are in degrees centigrade. The relationship of parts by weight to parts by volume is as that of kilograms to liters.

Example 1

300 parts of pure, de-aerated water, 75 parts of emulsifying solution (Nekal BX of B.A.S.F.), 5 parts of 1% potassium persulfate solution and 2 parts of 2-(2′-hydroxy-5′-β-carboallyloxyethylphenyl)benzotriazole (compound 1/1) are placed in a rocking autoclave which will contain 1000 parts by volume. After expelling the air with nitrogen and cooling to −30°, 200 parts of vinyl chloride are pumped in. While shaking well, the autoclave is heated and kept for 24 hours at 50°. The pressure is then released, the emulsion is transferred into a beaker and the polymer is precipitated with sodium chloride. Depending on the intended use, the polymer is washed with water or, in order to remove traces of monomer, is slurried several times with ethanol and finally washed with water. In any case, it is dried in vacuo.

100 parts of this polymer, 1.5 parts of Thermolite 31 (of Metal & Thermite Corporation, U.S.A.) as heat stabiliser and 1.0 parts of Wax E of BASF as lubricant are mixed in the dry state and the mixture is extruded into a film of 0.1 mm. thickness.

The stiff, colorless, transparent film absorbs UV light and is particularly suitable for packing liquids as no diffusion of the copolymeric absorber occurs into the contents of the packing. That 2-(2′-hydroxy-5′-β-carboallyloxyethylphenyl)-benzotriazole is copolymerized can be seen from the fact that it cannot be extracted from the polymer either by ethanol, acetic acid or soap water, whereas a physical mixture of the same substance with prepolymerized pure PVC before extrusion produces a similarly UV dense film, the absorption power of which is, however, completely lost on boiling with ethanol or soap water.

If, instead of the 2-(2′-hydroxy-5′-β-carboallyloxyethylphenyl)-benzotriazole, a similar amount of the compounds given below is used, then very similar sheets are obtained:

1/2 2-[2′-hydroxy-3′-(β-butoxycarbonylacryloylamido)-5′-methylphenyl]-benzotriazole,
1/2*a* 2-[2′-hydroxy-4′-(β-dodecyloxycarbonylacryloylamido)-phenyl]-benzotriazole,
1/3 2-(2′-hydroxy-3′-methyl-5′-β-carboallyloxyethylphenyl)-benzotriazole,
1/4 2(2′-hydroxy-5′-methacryloylamidomethylphenyl)-5-methoxy-6-methyl-benzotriazole,
1/5 2-(2′-hydroxy-3′-methacryloylamidomethyl-5′-cyclohexyl-phenyl)-benzotriazole,
1/6 2-[2′-hydroxy-5′-(β-butyloxycarbonylacryloylamido)-phenyl]-benzotriazole,
1/7 2-(2′-hydroxy-4′-N-ethyl-acryloylamidophenyl)-5-chloro-benzotriazole,
1/8 2-(2′-hydroxy-3′-α-phenyl-acryloylamidomethyl-5′-methyl-phenyl)-benzotriazole,
1/9 2-(2′-hydroxy-3′-α-chloro-acryloylamidomethyl-5′-methyl-phenyl)-benzotriazole,
1/10 2-(2′-hydroxy-3′-β-carboethoxyacryloylamidomethyl-5′-methylphenyl)-benzotriazole,
1/11 2-[2′-hydroxy-3′-(2″,5″-dioxo-$\Delta^{3''}$-pyrrolinyl-(1″)-methyl)-5′-methylphenyl]-benzotriazole,
1/12 2-[2′-hydroxy-5′-(p-carboallyloxyphenyl)-phenyl]-benzotriazole, or
1/12*a* 2-(2′-hydroxyphenyl)-5-acryloylbenzylamidobenzotriazole.

The allyl esters used in this and the following examples (Compounds Nos. 1/1, 1/3, 1/12, 6/3, 6/4, 6/5, 6/7, 6/13, 6/14, 6/15) are produced by esterification of the carboxylic acids with allyl alcohol using sulfuric acid as catalyst, as illustrated in Example 11, infra.

The allylamide (No. 6/6) is produced by reaction of allylamine with the corresponding acid chloride using pyridine as acid binding agent.

The acryloyl compounds (Nos. 1/7, 4/5, 4/6, 4/8, 6/8, 6/10, 6/12, 8/2, 9/2 and 9/3) are produced from the corresponding amino or hydroxy benzotriazole compounds by reaction with acryloyl chloride or methacryloyl chloride, using pyridine as acid binding agent.

The acryloyl or methacryloyl compounds (Nos. 1/4, 1/5, 1/8, 1/9, 2/1 through 2/15, 4/1, 4/2, 4/3, 4/4, 4/7, 5/1, 6/9, 7/1, 8/1, 9/1, 10/4, 10/5 and 10/6) are produced as described above by acylation of the aminomethyl compounds with acryloyl or with methacryloyl chloride; another method is the reaction of the methylol compounds of corresponding acrylic amides with benzotriazole compounds having a free 3'- or 5'-position, in concentrated sulfuric acid, described in Example 13, infra.

The vinyl esters (Nos. 6/1, 6/2) are produced by reaction of the corresponding acid chlorides with chloromercury acetaldehyde.

The vinyl derivatives 3/1 and 3/2 are produced by reaction of the corresponding acid chlorides with m- or p-vinyl aniline.

The propenyl compounds (Nos. 10/8, 10/9, 10/10, 10/11 and 10/12) are obtained by Claisen rearrangement of the corresponding 2-(2'-propenyloxyphenyl)-benzotriazole compounds. The 2-(2'-propenyloxyphenyl)-benzotriazole compounds in their turn are produced by propenylation of the corresponding 2-(2'-hydroxyphenyl)-benzotriazole compounds with the desired propenyl chlorides with the addition of sodium iodide.

The Compounds 1/2, 1/2*a*, 1/6, 1/10, 1/11, 6/16, 6/17, 6/18, 10/1, 10/2 and 10/3 which contain maleic acid monoamide or maleic acid imide groups are obtained by reaction of the corresponding amino or aminomethyl benzotriazole compound with maleic acid anhydride. The maleic acid monoamides, 10/1 and 10/3, are formed on simply bringing the two components together in boiling chlorobenzene; on esterifying the corresponding monoamides, Compounds 1/2, 1/2*a*, 1/6, 1/10, 6/16, 6/17, 6/18 and 10/2 are formed, whilst the maleic acid imide derivative (No. 1/11) is formed in the presence of an acid catalyst such as p-toluene sulfonic acid chloride whilst splitting off water.

The two vinyl sulfones 6/11 and 10/7 are produced from the corresponding β-hydroxyethyl sulfones by reaction with sulfuric acid and alkaline splitting of the sulfuric acid ester. (The β-hydroxyethyl sulfones are obtained from the sulfinic acids by reaction with ethylene chlorohydrin or ethylene oxide, and the sulfinic acids are formed by reduction of the sulfonic acid chlorides.)

The two carboxylic acid chlorides such as, e.g., 3/1 and 3/2 used for the production of amides, are obtained from the corresponding carboxylic acids by reaction with thionyl chloride.

The reactions mentioned above are all performed by the methods described in the literature.

Example 2

A mixture of 100 parts of styrene, 0.2 part of 2-(2'-hydroxy - 3' - acryloylamidomethyl - 5' - tert.butylphenyl)-benzotriazole (Compound No. 2/1 and 0.4 part of benzoyl peroxide is dispersed in a solution consisting of: 600 parts of water, 0.01 part of hydroquinone and 2 parts of polyvinyl alcohol (Polyviol W 28/20 of Wacker Chemie, Munich), the latter serving as protective colloid. While constantly stirring, the dispersion is kept for 8 hours at 80° and then for another 12 hours at 90°. A pearl polymer is obtained (pearl size about 0.3 to 3 mm. diameter) which, after washing with methanol, can be used for injection moulding. It is particularly suitable for preserving UV sensitive foodstuffs or pharmaceutical products because the UV absorber, which is part of the polymer, is not extracted by solvents which do not dissolve polystyrene.

If, instead of the benzotriazole compounds mentioned, 1 part of each of the compounds given below is copolymerized in the manner described above, then copolymers having very similar properties are obtained:

2/2 2-(2'-hydroxy-3'-methacryloylamidomethyl-5'-methylphenyl)-benzotriazole,
2/3 2-(2'-hydroxy-3'-acryloylamidomethyl-5'-tert. butylphenyl)-5-chloro-benzotriazole,
2/3*a* 2-(2'-hydroxy-3'-acryloylamidomethyl-5'-tert. butylphenyl)-5-bromo-benzotriazole,
2/4 2-(2'-hydroxy-3'-acryloylamidomethyl-5'-cyclohexylphenyl)-benzotriazole,
2/5 2-(2'-hydroxy-3'-acryloylamidomethyl-5'-benzylphenyl)-benzotriazole,
2/6 2-(2'-hydroxy-3'-acryloylamidomethyl-5'-phenylphenyl)-benzotriazole,
2/7 2-(2'-hydroxy-3'-acryloylamidomethyl-5'-methylphenyl)-benzotriazole-5-sulfonic acid butylamide,
2/8 2-[2'-hydroxy-3'-acryloylamidomethyl-5'-(1'',3'',5'',7''-tetracethyl-octyl)-phenyl]-benzotriazole,
2/9 2-[2'-hydroxy-3'-acryloylamidomethyl-5'-n-octylphenyl]-benzotriazole,
2/10 2-[2'-hydroxy-3'-acryloylamidomethyl-5'-n-dodecyl-phenyl]-benzotriazole,
2/11 2-[2'-hydroxy-3'-acryloylamidomethyl-5'-(1'',3'',5''-trimethyl-hexyl)-phenyl]-benzotriazole,
2/12 2-[2'-hydroxy-3'-methacryloylamidomethyl-5'-n-octyl-phenyl]-benzotriazole,
2/13 2-[2'-hydroxy-3'-methacryloylamidomethyl-5'-n-dodecyl-phenyl]-benzotriazole,
2/14 2-[2'-hydroxy-3'-acryloylamidomethyl-5'-(4''-methyl-benzyl)-phenyl]-benzotriazole,
2/15 2-(2'-hydroxy-3'-acryloylamidomethyl-5'-bromophenyl)-benzotriazole.

Example 3

100 parts of methylmethacrylate, 0.5 part of 2-(2'-hydroxy - 5' - tert.-butylphenyl) - benzotriazole-5-carboxylic acid m-vinyl anilide (Compound No. 3/1) and 0.2 part of lauroyl peroxide are mixed and the solution is heated in a glass mould for 48 hours at 70°. The glass-clear polymer so formed is UV dense and is suitable in particular for the production of UV-absorbing layers in contact with foodstuffs or which, under extreme conditions, e.g., in space conditions, should not lose any absorption power for UV light. If a plate of 0.5 mm. thickness was kept for 240 hours at 110° under a very high vacuum of $2\times10^{-5}$ mm. Hg, then no loss of UV-absorption properties could be determined.

If, instead of the above compound, 0.7 part of 2-(2'-hydroxy - 5' - [β -(carbo - p - vinylphenylamido) - ethyl]-phenyl)-benzotriazole (No. 3/2) are used, then a glass clear plate is obtained which has properties very similar to those of the plate described.

Example 4

300 parts of a commercially available polyester resin (Polylite 8000 of Reichhold Chemie, Hausen, Switzerland), 4 parts of 2-(2'-hydroxy-3'-acryloylamidomethyl-5'-methylphenyl) - 5 - chloro-benzotriazole (Compound 4/1), 100 parts of styrene, 0.04 part of Co-Accelerator-EWM (of Elektrochemischen Werke, Münich, Germany) and 4 parts of benzoyl peroxide are mixed and fiber glass fabric is soaked with this viscous solution. The ratio of resin/fiber glass fabric is about 7:3. Curing is performed between cellophane films for 30 minutes in a press previously heated to 90°. The transparent, 2 mm. thick synthetic plate reinforced with fiber glass which is formed is substantially dense for the UV light in the wavelengths of 290–390 mμ.

The following compounds can be used instead of the benzotriazole comonomer mentioned, a somewhat more yellowish plate being obtained:

4/2 2-(2'-hydroxy-3'-methacryloylmethylamidomethyl-5'-chloro-phenyl)-benzotriazole-5-carboxylic acid diethylamide,
4/3 2-(2'-hydroxy 3'-acryloylheptylamidomethyl-5'-methylphenyl)-benzotriazole-5-ethyl sulfone,
4/4 2-(2'-hydroxy-3'-acryloylamidomethyl-5'-methylphenyl)-benzotriazole-5-carboxylic acid,
4/5 2-(2'-hydroxy-5'-acryloylbenzylamidophenyl)-benzotriazole,
4/6 2-(2'-hydroxy-5'-acryloylmethylamidophenyl)-5-butoxy-6-methyl-benzotriazole,
4/7 2-(2'-hydroxy-3'-methacryloylbenzylamidomethyl-5'-methylphenyl)-4,6-dichloro-benzotriazole,
4/8 2-(2'-hydroxy-5'-methacryloylmethylamidophenyl)-4,6-dimethyl-benzotriazole.

Example 5

80 parts of styrene and 20 parts of 2-(2'-hydroxy-3'-methylacryloylbenzylamidomethyl - 5' - tert.butylphenyl)-benzotriazole (Compound 5/1) are dissolved in 1000 parts by volume of toluene. 0.9 part of α,α'-azodiisobutyronitrile are added while bubbling nitrogen through and the mixture is heated for 24 hours on a boiling water bath while gently stirring. The reaction mixture is then poured into 1500 parts by volume of methanol while stirring very well. The copolymer obtained is filtered off and dried in vacuo. It is then suitable as light stable polymer concentrate which can be mixed with conventional polystyrene in a ratio of 1:20.

Example 6

100 parts of vinyl acetate and 0.5 part of 2-(2'-hydroxy-5'-β-carbovinyloxyethylphenyl)-benzotriazole (Compound 6/1) in 200 parts by volume of benzene are refluxed under a blanket of nitrogen. 0.2 part of α,α'-azodiisobutyronitrile is then added and the mixture is refluxed for 2½ hours. 0.2 part of m-dinitrobenzene is then added and the solvent and excess vinyl acetate are removed with steam. After cooling, the polymer formed is crushed, the polymer is filtered off and washed.

Similar polymers are obtained if the following compounds are used instead of the benzotriazole comonomer mentioned:

6/2 2-(2'-hydroxy-3'-methyl-5'-β-carbovinyloxyethylphenyl)-5-methyl-benzotriazole,
6/3 2-(2'-hydroxy-5'-p-carboallyloxyphenylphenyl)-benzotriazole,
6/4 2-(2'-hydroxy-3'-o-carboallyloxyphenylmethyl-5'-methylphenyl)-benzotriazole,
6/5 2-(2'-hydroxy-5'-methylphenyl)-benzotriazole-5-sulfonic acid carboallyloxymethylamide,
6/6 2-[2'-hydroxy-5'-β-carbo(allylamido)ethylphenyl]-benzotriazole,
6/7 2(2'-hydroxy-5'-cyclohexylphenyl)-benzotriazole-5-carboxylic acid allyl ester,
6/8 2-[2'-hydroxy-5'-(N-methyl-acryloylamido)-phenyl]-benzotriazole,
6/8a 2-(2'-hydroxy-3'-acryloylamidomethyl-5'-benzylphenyl)-5-sulfonic acid-γ-methoxypropylamide,
6/9 2-[2'-hydroxy-3'-(acryloyl-N-cyclohexyl-amido)-methyl-5'-methylphenyl]-benzotriazole-5-sulfonic acid-N-methyl-N-cyclohexylamide,
6/10 2-(2'-hydroxy-4'-acryloyl-N-benzylamidophenyl)-benzotriazole-5-sulfonic acid dibutylamide,
6/11 2-(2'-hydroxy-3'-cyclohexyl-5'-methylphenyl)-benzotriazole-5-vinyl sulfone,
6/12 2-(2'-hydroxy-3'-acryloylbenzylamido-5'-benzylphenyl)-benzotriazole-5-methyl sulfone,
6/13 2-(2'-hydroxy-3',5'-di-tert.butylphenyl)-benzotriazole-5-carboxylic acid-N-methyl-N-β-carboallyloxyethylamide, 6/14 2-(2'-hydroxy-5'-α-phenylethylphenyl)-benzotriazole-5-carboxylic acid-N-butyl-N-β-carboallyloxyethylamide,
6/15 2-(2'-hydroxy-4',5'-dimethylphenyl)-benzotriazole-5-sulfonic acid-N-butyl-N-β-carboallyloxyethylamide,
6/15a 2-(2'-hydroxy-4',5'-dimethylphenyl)-benzotriazole-4-sulfonic acid-N-methyl-N-β-carboallyloxyethylamide,
6/16 2-[2'-hydroxy-4'-(β-methoxycarbonyl-acryloyl-N-benzylamido)-phenyl]-benzotriazole,
6/17 2-[2'-hydroxy-3'-(β-dodecyloxycarbonyl-acryloyl-N-methylamido)-5'-methylphenyl]-benzotriazole,
6/18 2-(2'-hydroxyphenyl)-5-(β-propoxycarbonyl-acryloyl-N-octyl-amido)-benzotriazole,
6/19 2-(2'-hydroxy-5'-methylphenyl)-benzotriazole-4-carboxylic acid N-methyl-N-carboallyloxymethylamide.

Example 7

300 parts by volume of an aqueous solution of 3 parts of ammonium persulfate, 1 part of sodium hydyroxide, 1.5 parts of sodium thiosulfate and 3 parts of sodium dodecanol sulfonate is de-aerated with nitrogen and then 100 parts of vinylidene chloride and 0.5 part of 2-(2'-hydroxy - 3' - acryloylamidomethyl - 5',1'',1'',3'',3''-tetramethylbutylphenyl)-benzotriazole (Compound 7/1) are added. The mixture is heated to 30° while stirring well and kept for 6 hours at this temperature. The polymer is precipitated from the copolymer emulsion obtained by addition of 150 parts by volume of saturated sodium chloride solution. After filtering off under suction the polymer is well washed with water and dried in vacuo.

Example 8

5 parts of soap flakes, 0.5 part of dodecyl mercaptan and 1 part of 2-(2'-hydroxy-3'-acryloyl-benzylamidomethyl-5'-tert.butylphenyl)-benzotriazole (Compound 8/1) are placed in a mineral water bottle in which the air has been removed by nitrogen, and 25 parts of styrene are added. The mixture is cooled to −5°, 75 parts of liquid butadiene are added and the whole is mixed by slight rotation. A solution, cooled to 0°, of 0.3 part of potassium persulfate in 180 parts of de-aerated water is then added. The mixture is slowly heated until the whole bottle is filled with butadiene vapour. The bottle is then sealed airtight and rotated in a water bath at 50° for 12 hours. 0.2 part of hydroquinone is then added and excess butadiene and styrene are liberated from the latex by steam distillation. After addition of 0.5 part of di-tert.butyl-p-cresol, the terpolymer is precipitated by the addition of saturated sodium chloride solution and dilute sulfuric acid. The polymer is filtered off, washed well with water and dried. It is suitable, in particular, for the production of light stable, non-staining elastomers.

If the following compounds are used instead of the benzotriazole comonomer mentioned, similar polymers which are suitable for the production of rubber articles is obtained.

8/2 2-(2'-hydroxy-4'-chlorophenyl)-5-methacryloylheptylamido-benzotriazole,
8/2a 2-(2'-hydroxy-4'-bromophenyl)-5-methacryloylheptylamido-benzotriazole.

Example 9

150 parts of vinylidene chloride, 0.4 part of 2-(2'-hydroxy - 3' - acryloylmethylamidomethyl-5'-phenylphenyl)-benzotriazole-5-carboxylic acid butyl ester (Compound 9/1) and 25 parts of acrylonitrile are mixed with 1 part of benzoyl peroxide and the mixture is polymerized for 10 days at 45° in an autoclave while excluding oxygen. The glassy terpolymer obtained, after crushing, can be moulded into UV dense films.

The following compounds can be used instead of the benzotriazole compound mentioned:

9/2 2-(2′-hydroxy-3′-acryloylcyclohexylamido-5′-methoxyphenyl)-benzotriazole-5-carboxylic acid butylamide, 9/3 2-(2′-hydroxy-3′-acryloylbenzylamido-5′-butoxyphenyl)-4,6-dichlorobenzotriazole.

Example 10

A solution of 5 parts of emulsifier (Nekal BX of B.A.S.F.), 0.25 part of ammonium persulfate and 0.1 part of sodium bisulfite in 100 parts of de-aerated water, 5 parts of vinyl acetate and 0.4 part of 2-(2′-hydroxy-3′-β-carboxyacryloylbenzylamidomethyl - 5′ - methylphenyl)-benzotriazole (compound 10/1) are cooled in a rocking autoclave to —20°. After replacing the air by nitrogen, 45 parts of vinyl chloride are pumped in. The autoclave is then heated for 2½ hours at 40° while shaking well. After cooling with ice, the pressure is released and the emulsion is transferred into a beaker and diluted with 100 parts of water. The terpolymer is precipitated by the addition of 10% ammonium sulfate solution at a raised temperature while stirring well. After filtering, the polymer is well washed with water and dried in vacuo. It is suitable for the production of UV dense films.

The following comonomers can be used instead of the benzotriazole compound mentioned:

10/2 2-2′-hydroxy-5′-β-carbooctyloxy-acryloylamidophenyl)-benzotriazole,

10/3 2-(2′-hydroxy-5′-β-carboxyacryloylbenzylamidophenyl)-benzotriazole,

10/4 2-(2′-hydroxy-3′-methacryloylamidomethyl-5′-methylphenyl)-benzotriazole-5-carboxylic acid octyl ester, 10/5 2-(2′-hydroxy-3′-methacryloylamidomethyl-5′-methylphenyl)-benzotriazole-5-carboxylic acid N-methyl-N-cyclohexylamide, 10/6 2-(2′-hydroxy-3′-methacryloylamidomethyl-5′-methylphenyl)-benzotriazole-5-carboxylic acid cyclohexyl ester, 10/7 2-(2′-hydroxy-3′-benzyl-5′-methylphenyl)-benzotriazole-5-vinyl sulfone, 10/7*a* 2-(2′-hydroxy-3′-methacryloylamidomethyl-5′-methylphenyl)-benzotriazole-5-carboxylic acid methyl ester, 10/7*b* 2-(2′-hydroxy-3′-methacryloylamidomethyl-5′-methylphenyl)-benzotriazole-5-carboxylic acid β-methoxyethyl-amide.

The following comonomers lead to terpolymers from which excess benzotriazole derivative has to be removed. This is done by extraction with a mixture of ethanol and a few drops of sodium hydroxide solution prior to the water wash:

10/8 2-(2′-hydroxy-3′-allyl-5′-tert.butylphenyl)-5-chloro-benzotriazole,

10/9 8-(2′-hydroxy-3′-β-methylvinyl-5′-tert.butylphenyl)-benzotriazole,

10/10 2-(2′-hydroxy-3′-α,α-dimethylallyl-5′-cyclohexylphenyl)-benzotriazole,

10/11 2-(2′-hydroxy-3′-α-pentylallyl-5′-methylphenyl)-benzotriazole,

10/12 2-(2′-hydroxy-3′-β-methylvinyl-5′-methylphenyl)-benzotriazole.

The following examples illustrate the preparation of some of the benzotriazoles which are useful as monomers in producing the stable copolymerizates according to the invention. Products produced by these examples have been claimed in our copending applications Ser. Nos. 202,667 and 202,668, now abandoned, both filed on June 15, 1962.

Example 11

(Production of Compound 1/1).—The moist filtrate of 2′-nitro-2-hydroxy-5-β-carboxyethylazobenzene obtained upon filtration of the coupling product of the diazonium chloride produced by diazotizing 27.6 g. of o-nitroaniline, and 33.2 g. of β-hydroxyphenylpropionic acid (produced by saponification of the corresponding nitrile which is produced by addition of acrylonitrile to phenol) is dissolved in 400 ml. of 2 N sodium hydroxide. 60 g. of zinc dust are added to the resulting solution and then 100 ml. of concentrated sodium hydroxide solution are added dropwise within one hour, the temperature being kept below 45°. The resulting yellow solution is acidified with concentrated hydrochloric acid while cooling until congo red paper is turned permanently blue. The precipitate formed is filtered off under suction, washed well with water and then dissolved in dilute sodium carbonate solution. This solution is filtered and the filtrate acidified. The precipitated 2-(2′-hydroxy-5′-β-carboxyethylphenyl)-benzotriazole is recrystallized from glacial acetic acid. 52 g. melting at 168° are thus obtained.

28.3 g. of 2-(2′-hydroxy - 5′ - β - carboxyethylphenyl)-benzotriazole are dissolved in 300 ml. of dry dimethylformamide. 14.0 g. of thionyl chloride are added dropwise to this solution whereupon the temperature is raised to 50–60°. After standing for 15 minutes at this temperature, the excess thionyl chloride is drawn off under vacuum and 100 ml. of allyl alcohol are added dropwise to the resultant solution of acid chloride at a temperature below 30°. This mixture is then heated three hours on a boiling water bath. Then, excess allyl alcohol and the dimethylformamide are removed in vacuo. The 2-(2′-hydroxy-5′-β - allyloxycarbonylethylphenyl) - benzotriazole so obtained is recrystallized from isopropanol yielding 25 g. of material melting at 92–93°.

In the same way, 2-(2′-hydroxy-5′-β-carboallylamidoethylphenyl)-benzotriazole is obtained when the 100 ml. of allyl alcohol are replaced by 20 g. of allylamine and the reaction mixture is worked up after 1 hour of heating on a boiling water bath as follows. After cooling, the mixture is made acid to congo red paper with dilute hydrochloric acid, the precipitate formed thereby is filtered off under suction and is recrystallized from dimethylformamide/glacial acetic acid. The corresponding vinyl ester 2-(2′-hydroxy-[5′-β-vinyloxycarbonyl]-ethylphenyl)-benzotriazole is obtained from the acid chloride with chloro-mercury acetaldehyde according to Houben-Weyl: Methoden der anorganischen Chemie, volume VII, part 1, p. 107 (Georg Thieme Verlag, Stuttgart, 1954).

The first mentioned allyl ester is also obtained as follows: 15 g. of 2-(2′-hydroxy-5′-β-carboxyethylphenyl)-benzotriazole, 30 g. of allyl alcohol and 0.9 g. of sulfuric acid are refluxed for three hours. Excess allyl alcohol is then distilled off and the residue is poured onto crushed ice. The 2-[2′-hydroxy-5′-(β-carboallyloxyethyl)phenyl]-benzotriazole so obtained is recrystallized from isopropanol and is by melting point and mixed melting point indentical with the product obtained from the acid chloride.

The allyl esters Nos. 1/3, 1/12, 6/3, 6/4, 6/5, 6/7, 6/13, 6/14, 6/15, 6/15*a* and the vinyl ester 6/2 are prepared analogously.

Example 12

(Production of Compound 1/6).—22.6 g. of 2-(2′-hydroxy-5′-aminophenyl)-benzotriazole, 9.8 g. of maleic anhydride and 250 ml. of chlorobenzene are heated together and kept at 120° for half an hour. After cooling the reaction mixture, the 2-(2′-hydroxy-5′-β-carboxyacryloylaminophenyl)-benzotriazole is filtered off and washed well with chlorobenzene.

81.0 g. of the 2-(2′-hydroxy-5′-β-carboxyacryloylaminophenyl)-benzotriazole are suspended in a mixture of 2000 ml. toluene and 500 ml. butanol. After further addition of 20 g. p-toluenesulfonic acid the mixture is heated to reflux and the water formed is separated azeotropically. After 2 hours approximately 5.4 ml. of water is separated and the mixture has become homogeneous.

The solvents are removed under reduced pressure and the 2-(2'-hydroxy-5'-β-butoxycarbonylacryloylaminophenyl)-benzotriazole is isolated from the residue and recrystallized from toluene.

A cis-trans isomer is obtained as follows:

6.8 g. of 2-(2'-hydroxy-5'-aminophenyl)-benzotriazole are dissolved in 100 ml. of dimethylformamide. To this solution are added in succession, 3 g. of sodium acetate and 5.7 g. of fumaric acid butylester chloride, the latter over a period of 20 minutes. After complete addition the resulting mixture is stirred at 50° for 30 minutes and then diluted with 50 ml. of water. The precipitate formed is filtered off at room temperature and is crystallized from toluene. The 2-(2'-hydroxy-5'-β-butoxycarbonylacryloylaminophenyl)-benzotriazole thus obtained melts at 198°.

The fumaric acid butylester chloride is made analogously to the corresponding methyl ester according to Journal Am. Chem. Soc. 81, 5946.

The β-carboxyacryloyl derivatives such as 1/2, 1/2*a*, 1/6, 1/10, 1/11, 6/16, 6/17, 6/18, 10/1, 10/2 and 10/3 are made by methods analogous to the ones described above.

Example 13

(Production of Compound 1/5).—The crude 2-nitro-2'-hydroxy-5'-cyclohexyl-(1,1')-azobenzene obtained by coupling 10 g. diazotized o-nitroaniline and 17.6 g. p-cyclohexylphenol is dissolved in a mixture of 150 ml. 3 N-sodium hydroxide and 200 ml. of methanol. 30 g. of zinc dust are added in portions of approximately 2 g. each to this solution, with good mechanical stirring, while the temperature is kept below 25° with external cooling. After complete addition of the zinc, the mixture is stirred at 25° until the red-violet color of the mixture has completely changed into an orange-yellow color. The mixture is then heated to reflux within 2 hours and kept there for another hour. After cooling the reaction mixture is acidified with respect to congo-red paper with 3 N hydrochloric acid and filtered. The filter cake is carefully washed with 1/10 N hydrochloric acid and then with water. While still wet it is then heated to the boil with enough glacial acetic acid to dissolve the organic matter completely. The acetic acid solution is then decanted from the zinc sludge and treated dropwise with water until a slight turbidity appears. Careful cooling yields the crude 2-(2'-hydroxy-5'-cyclohexylphenyl-benzotriazole in an amount of 18 g. The compound can be purified by recrystallization from glacial acetic acid and from a light petroleum fraction (B.P. 100–130°). It then melts at 138°.

In portions of 1 g. each, 10.1 g. of N-methylolacrylamide are added to a solution of 29.3 g. of 2-(2'-hydroxy-5'-cyclohexylphenyl)-benzotriazole in 100 ml. of concentrated sulfuric acid while maintaining the temperature at 5–10°. After complete addition of the methylol compound, the resulting solution is allowed to reach room temperature and is kept there for 2 hours. Then the reaction mixture is poured with good stirring onto finely crushed ice. The precipitate is filtered off under suction, washed neutral with water and crystallized from ethylene glycol monomethylether. The 2-(2'-hydroxy-3'-acryloylaminomethyl-5'-cyclohexylphenyl)-benzotriazole melts at 188°.

The acryloyl- and methacryloyl compounds (1/4, 1/5, 2/1 through 2/16, 4/1, 4/4, 6/8*a*, 7/1, 10/4, 10/5, 10/6, 10/7*a* and 10/7*b*) are prepared analogously from the corresponding benzotriazole compound with free 3'- or 5'-position and N-methyloylmethacrylamide.

Example 14

(Production of Compound 1/7).—The crude 2-nitro-4-chloro-2'-hydroxy-4'-ethylamino-1,1'-azobenzene obtained by acid coupling of 17.3 g. of diazotized 2-nitro-4-chloroaniline and 13.7 g. of m-ethylaminophenyl, is stirred with 150 ml. of 3 N sodium hydroxide solution. 20 g. of zinc dust are added to this mixture in such a way that the temperature does not rise above 40°. 35 ml. of concentrated sodium hydroxide solution are then added within 10 minutes, the temperature not being allowed to rise above 60°. A further 7.5 g. of zinc dust are gradually added and the mixture is stirred for some time. It is then poured into 175 ml. of concentrated hydrochloric acid in 100 ml. of water as quickly as the foam formation allows. On completion of the addition, the mixture is stirred for 15 minutes and then filtered. The still moist filter cake is stirred with 100 ml. of ethylene glycol monomethyl ether and 10 g. of sodium acetate, the resulting mixture is refluxed and filtered while hot. From the filtrate the 2-(2'-hydroxy-4-ethylaminophenyl)-5-chlorobenzotriazole is precipitated with water and purified by recrystallization from a petroleum fraction boiling between 170 and 200°.

9.1 g. of acryloylchloride is dropped into a well stirred slurry of 28.8 g. of 2-(2'-hydroxy-4-ethylaminophenyl)-5-chloro-benzotriazole in 100 ml. of a petroleum fraction (B.P. 100–130°). 12.1 g. of N,N-dimethylaniline are then added dropwise and the mixture is slowly heated to the boiling point and refluxed for 20 minutes. The solvent is then removed under reduced pressure, the semi-solid residue is washed with 0.1 N hydrochloric acid and water and finally recrystallized from methylethyl-ketone. The 2-(2'-hydroxy-4'-N-ethyl-acryloylaminophenyl)-5-chlorobenzotriazole melts at 118°.

The use of 100 ml. of pyridine as solvent instead of the 100 ml. of petroleum fraction and 12.1 g. of dimethylaniline produced substantially the same results.

The acryloyl- and methacryloyl monomers 4/5, 4/6, 4/8, 6/8, 6/10, 6/12, 8/2, 8/2*a*, 9/2 and 9/3, are prepared analogously by acylation of the corresponding aminobenzotriazoles with acryloylchloride or methacryloyl chloride.

The acryloyl- and methacryloylaminomethylmonomers, with a tertiary amido group, e.g., 1/8, 1/9, 4/2, 4/3, 4/7, 5/1, 6/9, 8/1 and 9/1 are also made by the above method.

Example 15

(Production of Compound 6/13).—To a well stirred slurry of 36.7 g. of 2-(2'-hydroxy-3',5'-di-tert.butylphenyl)-benzotriazole-5-carboxylic acid, obtained by coupling diazotized 3-nitro-4-aminobenzoic acid and 2,4-di-tert. butylphenol and reducing the resulting o-nitroazo compound with zinc dust, in 100 ml. of chlorobenzene, 2 ml. of dimethylformamide and 12 ml. of thionylchloride are added in succession. This mixture is then slowly heated in a water bath whereupon a strong HCl-evolution sets in. After the formation of hydrogen chloride has subsided the reaction mixture is kept at 100° for an hour after which time the excess thionylchloride and the solvent are removed under reduced pressure. The residue is heated with 20 ml. of toluene. After cooling the 2-(2'-hydroxy-3',5'-di-tert.butylphenyl)-benzotriazole - carboxylic acid chloride crystallizes and is purified by recrystallization from a petroleum fraction (B.P. 100–130°). It then melts at 160°.

To a stirred mixture of 38.5 g. of this acid chloride and 100 ml. of a petroleum fraction (B.P. 100–130°) a solution of 28.7 g. of the allylester of N-methyl-β-alanine in 200 ml. of the same solvent is added dropwise at room temperature. The reaction mixture is then heated on a water bath for two hours. The solvent is removed under reduced pressure and the residue is washed well with water. The crude 2-(2'-hydroxy-3',5'-di-tert.butylphenyl)-benzotriazole-5-carboxylic acid-N-methyl-N-β-carboallyloxyethylamide is purified by crystallization from a petroleum fraction (B.P. 110–130°) from which it is deposited in lemon yellow crystals.

Compounds 6/5, 6/14, 6/15 and 6/15*a* are prepared analogously. For the two last-mentioned sulfonamides the sodium salt is used instead of the free acid.

Example 16

(Production of Compound 6/11).—2-(2'-hydroxy-3'-cyclohexyl-5'-methylphenyl)-benzotriazole - 5 - sulfonylchloride (obtained with thionylchloride from the sodium salt of the corresponding sulfonic acid, which itself is formed upon reduction of the coupling product of diazotized sodium 3-nitro-4-amino-benzenesulfonate and 2-cyclohexyl-4-methylphenol) is reduced to the corresponding sodium sulfinate with sodium sulfite at about pH 9 according to the method given in Houben-Weyl, Methoden der organischen Chemie, volume 9, p. 306 (Georg Thieme Verlag, Stuttgart 1955). The sodium 2-(2'-hydroxy-3'-cyclohexyl-5'-methylphenyl) - benzotriazole - 5-sulfinate is converted with β-chloroethanol into the corresponding β-hydroxyethyl-sulfone. The latter is esterified with concentrated sulfuric acid to the sulfonic acid semiester, which in turn is transformed into the 2-(2'-hydroxy-3'-cyclohexyl-5'-methylphenyl)-5 - vinylsulfonyl - benzotriazole, which crystallizes from toluene in light yellow crystals. All these operations are performed according to Deutsche Patentanmeldung No. 57846 (filed Jan. 8, 1942, published Oct. 4, 1951).

Compound 10/7 is prepared analogously.

The propenyl compounds, 10/8, 10/9, 10/10, 10/11 and 10/12, are obtained by Claisen rearrangement of the corresponding ethers as described in our Patent 3,218,332, issued Nov. 16, 1965; for example Compound 10/12 is obtained by Claisen rearrangement of the reaction product from methallyl chloride and 2-(2'-hydroxy-5'-methylphenyl)-benzotriazole.

Example 17

10.1 g. of N-methylol-acrylic acid amide are slowly added at 5–10° to a solution of 26 g. of 2-(2'-hydroxy-5'-methylphenyl)-5-chlorobenzotriazole in 100 ml. of concentrated sulfuric acid. On working up, 30 g. of 2-(2'-hydroxy-3'-acryloylamidomethyl-5'-methylphenyl)-5-chlorobenzotriazole are obtained. M.P. 226–228°.

On using equivalent amount of the following starting materials:

2-(2'-hydroxy-5'-methylphenyl)-benzotriazole,
2-(2'-hydroxy-5'-methylphenyl)-benzotriazole-5-sulfonic acid butylamide,
2-(2'-hydroxy-5'-methylphenyl)-5-carboxy-benzotriazole,
2-(2'-hydroxy-5'-benzylphenyl)-benzotriazole,
2-(2'-hydroxy-5'-phenylphenyl)-4-chloro-benzotriazole and 2-(2'-hydroxy-5'-chlorophenyl)-benzotriazole,
the following acryloylamides are obtained:
2-(2'-hydroxy-3'-acryloylamidomethyl-5'-methylphenyl-benzotriazole,
2-(2'-hydroxy-3'-acryloylamidomethyl-5'-methylphenyl)-benzotriazole-5-sulfonic acid butylamide,
2-(2'-hydroxy-3'-acryloylamidomethyl-5'-methylphenyl)-5-carboxy-benzotriazole,
2-(2'-hydroxy-3'-acryloylamidomethyl-5'-benzylphenyl)-benzotriazole,
2-(2'-hydroxy-3'-acryloylamidomethyl-5'-phenylphenyl)-4-chloro-benzotriazole, and
2-(2'-hydroxy-3'-acryloylamidomethyl-5'-chlorophenyl)-benzotriazole.

Example 18

22.5 g. of 2-(2'-hydroxy-5'-methylphenyl)-benzotriazole are dissolved at room temperature in 75 ml. of concentrated sulfuric acid and the solution obtained is cooled to 5–10°. At this temperature, 11.5 g. of N-methylol-methacrylamide are added in portions. On completion of the addition the whole is stirred for 2 hours at 20° and the reaction mixture is poured, while stirring, onto ice. The precipitate obtained is filtered off under suction, washed neutral with water and crystallized from ethylene glycol monomethyl ether. The 2-(2'-hydroxy-3'-methacryloylamidomethyl-5'-methylphenyl)-benzotriazole melts, at 176°.

If instead of N-methylol-methacrylamide, equivalent amounts of N-methylol-α-phenylacrylamide or N-methylol-α-chloroacrylamide are used, then 2-(2'-hydroxy-3'-α-phenylacryloylamidomethyl - 5' - methylphenyl) - benzotriazole, or 2-(2'-hydroxy-3'-α-chloroacryloylamidomethyl-5'-methylphenyl)-benzotriazole is obtained.

Example 19

12 g. of 2-(2'-hydroxy-3'-amino-5'-methylphenyl)-benzotriazole are heated in 150 ml. of pyridine to 80° and 6 g. of methacrylic acid chloride are added dropwise to this solution. After half an hour, a little animal charcoal is added, the mixture is filtered hot and the residue is washed with hot pyridine. The filtrate is diluted with water, the precipitate formed is filtered off under suction, washed with water and crystallized from methanol. 13 g. of 2-(2'-hydroxy-3'-methacryloylamido-5'-methylphenyl)-benzotriazole are obtained.

Having thus disclosed the invention what is claimed is:

1. An organic addition polymer of ethylenically unsaturated polymerizable organic monomers, which consists essentially of divalent repetitive units of (A) from about 0.01 to 25%, of the total weight of said addition polymer, of benzotriazole units of the formula

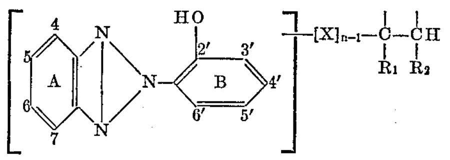

(I)

in which formula $n$ represents 1 or 2, $R_1$ represents hydrogen, lower alkyl, chlorine or phenyl, $R_2$ represents hydrogen, carboxyl or alkoxycarbonyl of from 2 to 9 carbon atoms, at least one of $R_1$ and $R_2$ being hydrogen, —X—, in the case of $n$ being 2, represents a bridge member selected from the group consisting of (a) —D—, being alkylene of from 1 to 6 carbon atoms or benzylene and being linked in 3'-position to ring B, (b)

—D—N(R₃)—CO— linked via —D— in one of the positions 3' and 5' to ring B, wherein —D— has the same meaning as under (a), supra, and $R_3$ represents hydrogen, alkyl of from 1 to 7 carbon atoms, cyclohexyl or benzyl;

(c) —D'—COO—$(CH_2)_{y-1}$—, linked via —D'— in one of the positions 3' and 5' to ring B, wherein D' represents —D— or phenylene wherein —D— has the same meaning as under (a), supra, and $y$ represents the numeral 1 or 2;

(d)

—D—CO—N(R₃)—CH₂— linked via —D—, in 3' and 5' position to ring B, wherein —D— and $R_3$ have the same meaning as under (b), supra; or

—X—C(R₁)—CH(R₂)

represents (e)

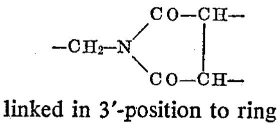

linked in 3'-position to ring B, the nucleus A being further substituted in the 4-, 5- and/or 6-position by hydrogen, chlorine or bromine, lower alkyl, lower alkoxy, carboxyl, alkoxy-carbonyl of from 2 to 9 carbon atoms, cyclohexyloxycarbonyl, lower alkyl sulfonyl, N-lower alkyl-substituted carbamyl, N-cyclohexyl-substituted carbamyl, N-lower alkyl-substituted sulfamyl, N-cyclohexyl-substituted sulfamyl, N-(oxa-lower alkyl)-substituted carbamyl, or N-(oxa-lower alkyl)-substituted sulfamyl;

and the nucleus B being further substituted in positions 3′, 4′ and/or 5′ by hydrogen, alkyl of from 1 to 12 carbon atoms, lower alkoxy, chlorine, bromine, phenyl-lower alkyl, phenyl or cyclohexyl, and (B) the balance of units of ethylenically unsaturated organic monomer different from the said benzotriazole units.

2. An organic addition polymer of ethylenically unsaturated polymerizable organic monomers, which consists essentially of divalent repetitive units of (A) from about 0.01 to 25%, calculated on the total weight of the addition polymer, of benzotriazole units selected from the class consisting of (i) a unit of the formula

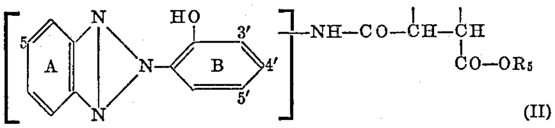

(II)

wherein $R_5$ represents alkyl of from 4 to 12 carbon atoms, benzyl or cyclohexyl;

(ii) a unit of the formula

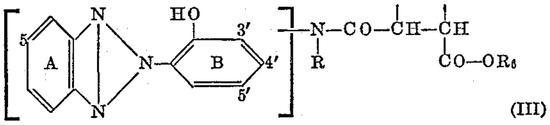

(III)

wherein $R_4$ rpresents alkyl of from 1 to 7 carbon atoms, cyclohexyl or benzyl, and $R_6$ represents hydrogen, alkyl of from 1 to 12 carbon atoms, benzyl or cyclohexyl;

(iii) a unit of the formula

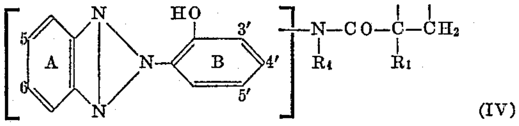

(IV)

wherein $R_1$ represents hydrogen, lower alkyl, chlorine or phenyl and $R_4$ has the same meaning as in Formula III, each of the acylamino substitutents of Formulas II, III and IV being linked to either the 5-position of ring A or one of the 3′-, 4′- or 5′-positions of ring B;

(iv) a unit of the formula

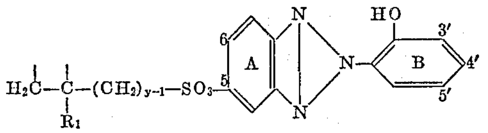

(V)

wherein $R_1$ has the same meaning as in Formula IV and $y$ is one of the numerals 1 and 2;

the nucleus A being further substituted in the 4-, 5- and/or 6-position by hydrogen, chlorine or bromine, lower alkyl, lower alkoxy, carboxyl, alkoxy-carbonyl of from 2 to 9 carbon atoms, cyclohexyloxycarbonyl, lower alkyl sulfonyl, N-lower alkyl-substituted carbamyl, N-cyclohexyl-substituted carbamyl, N-lower alkyl substituted sulfamyl, N-cyclohexyl-substituted sulfamyl, N-(oxa-lower alkyl)-substituted carbamyl, or N-(oxa-lower alkyl)-substituted salfamyl;

and the nucleus B being further substituted in positions 3′, 4′ and/or 5′ by hydrogen, alkyl of from 1 to 12 carbon atoms, lower alkoxy, chlorine, bromine, phenyl-lower alkyl, phenyl or cyclohexyl, and (B) the balance of units of ethylenically unsaturated organic monomer different from the said benzotriazole units.

3. An organic addition polymer of ethylenically unsaturated polymerizable organic monomers, which consists essentially of divalent repetitive units of (A) from about 0.01 to 25%, calculated on the total weight of the addition polymer, of benzotriazole units of the formula

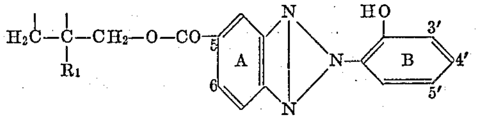

wherein $R_1$ represents hydrogen, lower alkyl, chlorine or phenyl;

the nucleus A being further substituted in the 4- and/or 6-position by hydrogen, chlorine or bromine, lower alkyl, lower alkoxy, carboxyl, alkoxy-carbonyl of from 2 to 9 carbon atoms, cyclohexyloxycarbonyl, lower alkyl sulfonyl, N-lower alkyl-substituted carbamyl, N-cyclohexyl-substituted carbamyl, N-lower alkyl-substituted sulfamyl, N-cyclohexyl-substituted sulfamyl, N-(oxa-lower alkyl)-substituted carbamyl, or N-(oxa-lower alkyl)-substituted sulfamyl;

and the nucleus B being further substituted in positions 3′, 4′ and/or 5′ by hydrogen, alkyl of from 1 to 12 carbon atoms, lower alkoxy, chlorine, bromine, phenyl-lower alkyl, phenyl or cyclohexyl, and (B) the balance of the units of ethylenically unsaturated organic monomer different from the said benzotriazole units.

4. An organic addition polymer of ethylenically unsaturated polymerizable organic monomers, which consists essentially of divalent repetitive units of (A) from about 0.01 to 25%, calculated on the total weight of the addition polymer, of benzotriazole units of the formula

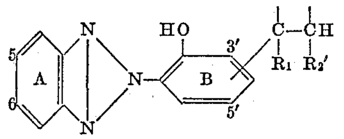

wherein $R_1$ represents hydrogen, lower alkyl, chlorine or phenyl, $R_2'$ represents hydrogen or methyl, at least one of $R_1$ and $R_2'$ being hydrogen, said substituent

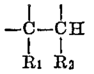

being linked to one of positions 3′ and 5′ of ring B;

the nucleus A being further substituted in the 4-, 5- and/or 6-position by hydrogen, chlorine or bromine, lower alkyl, lower alkoxy, carboxyl, alkoxy-carbonyl of from 2 to 9 carbon atoms, cyclohexyloxycarbonyl, lower alkyl sulfonyl, N-lower alkyl-substituted carbamyl, N-cyclohexyl-substituted carbamyl, N-lower alkyl-substituted sulfamyl, N-cyclohexyl-substituted sulfamyl, N-(oxa-lower alkyl)-substituted carbamyl, or N-(oxa-lower alkyl)-substituted sulfamyl;

and the nucleus B being further substituted in positions 3′, 4′ and/or 5′ by hydrogen, alkyl of from 1 to 12 carbon atoms, lower alkoxy, chlorine, bromine, phenyl-lower alkyl, phenyl or cyclohexyl, and (B) the balance of units of ethylenically unsaturated organic monomer different from the said benzotriazole units.

5. An organic addition polymer of ethylenically unsaturated polymerizable organic monomers, which consists essentially of divalent repetitive units of (A) from about 0.01 to 25% of the total weight of said addition polymer, of benzotriazole units of the formula

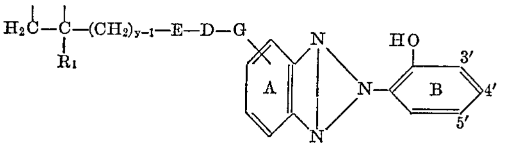

in which formula $y$ represents one of the integers 1 and 2,

D represents alkylene of from 1 to 6 carbon atoms or benzylene,

G represents —$SO_2$—N(lower alkyl)—, —CO—NH— or —CO—N(lower alkyl)— or —$SO_2$—NH—, E represents —O—, —O—CO—,

—CO—O—

—$SO_2$—, $-\underset{R_3}{N}-CO-$ or $-\underset{R_3}{N}-SO_2-$ $R_3$ representing hydrogen, alkyl or from 1 to 7 carbon atoms, cyclohexyl or benzyl in the case of Y being 2, and alkyl of from 1 to 7 carbon atoms, cyclohexyl or benzyl in the case of $y$ being 1, and $R_1$ represents hydrogen, lower alkyl, chlorine or phenyl;

the nucleus A being further substituted in the 4-, 5- and/or 6-position by hydrogen, chlorine or bromine, lower alkyl, lower alkoxy, carboxyl, alkoxy-carbonyl of from 2 to 9 carbon atoms, cyclohexyloxycarbonyl, lower alkyl sulfonyl, N-lower alkyl-substituted carbamyl, N-cyclohexyl-substituted carbamyl, N-lower alkyl-substituted sulfamyl, N-cyclohexyl-substituted sulfamyl, N-(oxa-lower alkyl)-substituted carbamyl, or N-(oxa-lower alkyl)-substituted sulfamyl;

and the nucleus B being further substituted in positions 3′, 4′ and/or 5′ by hydrogen, alkyl of from 1 to 12 carbon atoms, lower alkoxy, chlorine, bromine, phenyl-lower alkyl, phenyl or cyclohexyl, and (B) the balance of units of ethylenically unsaturated organic monomer different from the said benzotriazole units.

6. An organic addition polymer as defined in claim 1, wherein $n$ represents 2.

7. An organic addition polymer as defined in claim 1, wherein $n$ represents 2, and —X— is linked in 3′-position to ring B and represents —$CH_2$—, $-\underset{|}{C}H\text{-(lower alkyl)}$ or $-\underset{|}{C}H\text{-phenyl}$

8. An organic addition polymer as defined in claim 1, wherein $n$ represents 2, and —X— represents $$-CH_2-\underset{R_3}{N}-CO$$

and is linked via its —$CH_2$— group to the 3′-position of ring B.

9. An organic addition polymer as defined in claim 1, wherein $n$ represents 2, and —X— represents $$-CH_2-CH_2-CO-O-(CH_2)_{y-1}-$$

or —$CH_2$—(phenylene)—CO—O$(CH_2)_{y-1}$— and is linked to one of the positions 3′ and 5′ of ring B via the hydrocarbon radical in X which is linked directly to the carbonyl group therein.

10. An organic addition polymer as defined in claim 1, wherein $n$ represents 2, and —X— represents $$-CH_2-CO-\underset{R_3}{N}-CH_2- \text{ or } -CH_2\text{-(phenylene)-}CO-\underset{R_3}{N}-CH_2-$$

and is linked to the 3′- or to the 5′-position of ring B via the hydrocarbon group in X which is directly bonded to the carbonyl group therein.

11. An organic addition polymer as defined in claim 9, wherein —X— is linked in 5′-position to ring B, $y$ represents 2, and each of $R_1$ and $R_2$ is hydrogen.

12. An organic addition polymer as defined in claim 9, wherein —X— is linked in 5′-position to ring B, $y$ represents 1, and each of $R_1$ and $R_2$ is hydrogen.

13. An organic addition polymer as defined in claim 1 wherein —X— represents $$-CH_2-NH-CO-\overset{|}{C}H-\overset{|}{C}H_2$$

linked in 3′-position to ring B, and the latter ring is further substituted by methyl in 5′-position.

14. An organic addition polymer as defined in claim 1, wherein —X— represents $$-CH_2-NH-CO-\overset{|}{\underset{CH_3}{C}}-\overset{|}{C}H_2$$

linked in 3′-position to ring B and the latter ring is further substituted by methyl in 5′-position.

15. An organic addition polymer as defined in claim 1, wherein —X— represents $$-CH_2-NH-CO-\overset{|}{C}H-\overset{|}{C}H_2$$

linked in 3′-position to ring B, and the latter ring is further substituted by t-butyl in 5′-position.

16. An organic addition polymer as defined in claim 3, wherein $R_1$ represents hydrogen.

17. An organic addition polymer as defined in claim 1, wherein —X— represents $$-CH_2-NH-CO-\overset{|}{C}H-\overset{|}{C}H_2$$

linked in 3′-position to ring B, and the latter ring is further substituted by 1,1,3,3-tetramethyl-butyl, in 5′-position.

No references cited.

JOSEPH L. SCHOFER, *Primary Examiner.*

H. WONG, *Assistant Examiner.*